United States Patent [19]
Ozawa

[11] Patent Number: 5,812,837
[45] Date of Patent: Sep. 22, 1998

[54] DATA PROCESSING APPARATUS FOR CONTROLLING AN INTERRUPT PROCESS AND ITS METHOD

[75] Inventor: Toshihiro Ozawa, Kawasaki, Japan

[73] Assignee: Fujitsu Limited, Kawasaki, Japan

[21] Appl. No.: 510,120

[22] Filed: Aug. 1, 1995

[30] Foreign Application Priority Data

Sep. 1, 1994 [JP] Japan .................................. 6-208305

[51] Int. Cl.⁶ .......................................................... G06F 1/04
[52] U.S. Cl. ........................... 395/561; 395/582; 395/734
[58] Field of Search ................................... 395/800, 734, 395/561, 582.587, 800.01

[56] References Cited

U.S. PATENT DOCUMENTS

| | | | |
|---|---|---|---|
| 4,484,271 | 11/1984 | Miu et al. | 395/591 |
| 5,003,462 | 3/1991 | Blaner et al. | 395/800 |
| 5,155,853 | 10/1992 | Mitsuhira et al. | 395/725 |
| 5,185,868 | 2/1993 | Tran | 395/393 |
| 5,185,871 | 2/1993 | Frey et al. | 395/381 |
| 5,303,377 | 4/1994 | Gupta et al. | 395/709 |
| 5,537,559 | 7/1996 | Kane et al. | 395/375 |
| 5,560,032 | 9/1996 | Nguyen et al. | 395/800 |
| 5,568,623 | 10/1996 | Ogawa | 395/392 |
| 5,625,835 | 4/1997 | Ebcioglu | 395/800.23 |

OTHER PUBLICATIONS

Register renaming and dynamic speculation: an alternative approach by Vassiliades et al., 1993 IEEE publication pp. 202–213, 1993.

Speculative execution and reducing branch penalty issue machine by Ando et al., 1993 IEEE publication pp. 106–113, 1993.

Three architectural models for complier–controlled speculation by Warter et al., 1995 IEEE publication pp. 481–494, 1995.

Architecture–compatible code boosting for performance enhancement of the IBM, RS/6000, pp. 86–93, 1993.

*Primary Examiner*—Parshotam S. Lall
*Assistant Examiner*—Zarni Maung
*Attorney, Agent, or Firm*—Staas & Halsey

[57] ABSTRACT

An interrupt processing apparatus is set if an interrupt factor occurs during execution of a moved instruction. The interrupt processing unit generates an interrupt single when processing after execution of a branch instruction proceeds towards an original location of the moved instruction, and resets when the processing after execution of the branch instruction proceeds in a direction different from the original location of the moved instruction.

10 Claims, 10 Drawing Sheets

```
add R4, R2, Re ;        (1)

cmp R3, 0 ;             (2)

bzero LABEL ;           (3)

load R1, 0 (R3);        (4)

add R1, R4, R3 ;        (5)
```

FIG. 1

```
add R4, R2, R3 ;        (1)

load R1, 0 (R3) ;       (4)

cmp R3, 0 ;             (2)

bzero LABEL ;           (3)

add R1, R4, R3 ;        (5)
```

FIG. 2

```
add R4, R2, R3;     (1)        add R4, R2, R3 ;    (1)
cmp R3, 0 ;         (2)        load R1, 0 (R3) ;   (4)
bzero label ;       (3)        cmp R3, 0 ;         (2)
add R1, R4, R3;     (5)   ⇒    bzero LABEL ;       (3)
LABEL                          add R1, R4, R3;     (5)
load R1,0 (R3) ;    (4)        LABEL
sub R5, R1, R6 ;    (7)        sub R5, R1, R6 ;    (7)
```

FIG. 3

```
add R4, R2, R3 ;        (1)
load R1, 0 (R3) ;       (4)
cmp R3, 0 ;             (2)
bzero LABEL ;           (3)
sentinel R1 ;           (6)
add R1, R4, R3 ;        (5)
```
FIG. 4
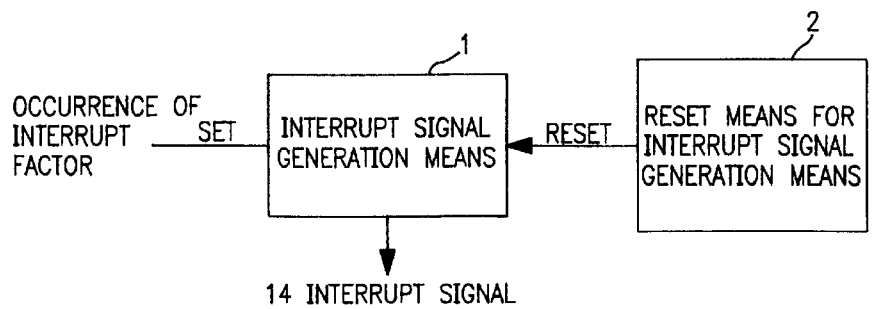
FIG. 5
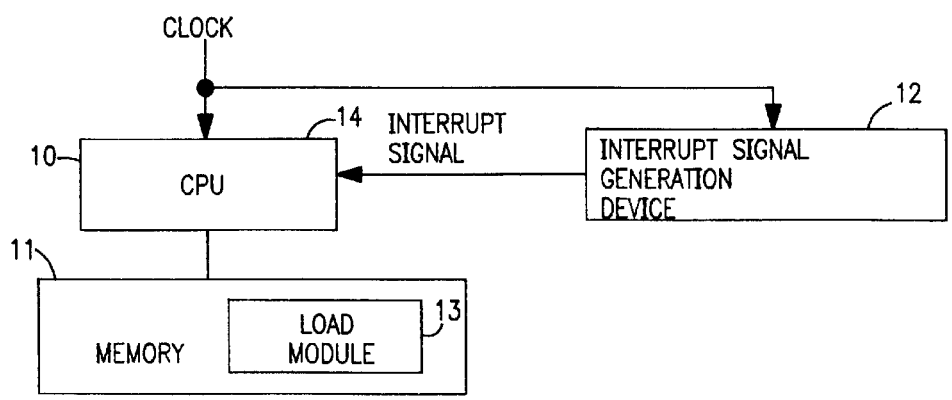
FIG. 6

```
0X2000    add   R4, R2, R3 ;    (1)
0X2004    load  R1, 0(R3) ;     (4)
0X2008    cmp   R3, 0,    ;     (2)
0X200C    bzero LABEL ;         (3)
0X2010    add   R1, R4, R3 ;    (5)
```

| DESTINATION ADDRESS | BRANCH INSTRUCTION ADDRESS | BRANCH DIRECTION | PASS LENGTH |
|---|---|---|---|
| 0X2004 | 0X200C | 0 | 3 |

LABEL 1 :
add R4, 1, R4;
add R4, R2, R3 ;
cmp R4, 0 ;
bzero LABEL 1 ;
bplus LABEL 2 ;
add R11, R12, R13
add R13, R14, R15 ;
add R15, R16, R17 ;
add R17, R18, R19 ;
add R19, R20, R21
add R21, R22, R23 ;
LABEL 2 :
cmp R3, 0 ;
bzero LABEL 3 ;
load R1, 0 (R3) ;

FIG. 11A

LABEL 1 :
add R4, 1, R4;
add R4, R2, R3 ;
load R1, 0 (R3) ;
cmp R4, 0 ;
(1) bzero LABEL 1 ;
(2) bplus LABEL 2 ;
add R11, R12, R13 ;
add R13, R14, R15 ;
add R15, R16, R17 ;
add R17, R18, R19 ;
add R19, R20, R21
add R21, R22,         ;
LABEL 2 :
cmp R3, 0 ;
✗bzero LABEL 3 ;

FIG. 11B

DATA PROCESSING APPARATUS FOR CONTROLLING AN INTERRUPT PROCESS AND ITS METHOD

FIELD OF THE INVENTION

This invention relates to a Data Processing Apparatus and particularly, the invention relates to the interrupt Processing Unit that controls an interrupt caused by an interrupt factor while executing a load instruction moved before a branch instruction in order to prevent a delay caused by, for example, a cache miss, depending on whether processing after execution of the branch instruction proceeds toward the original location of the load instruction.

PRIOR ART OF THE INVENTION

In recent computer systems, processor speed is relatively faster than memory speed. Therefore, it is important to consecutively supply data to a processor so that the computer system can gain in efficiency. In case a cache miss occurs when using a normal load instruction, the next instruction cannot be executed until data loading or data reading from memory into cache is complete. These activities degrade computer system performance. Such performance degradation caused by discontinuous processing during the data read from memory into cache is called a cache miss penalty.

FIG.1 shows an example program for a cache miss penalty. By way of this example, if a cache miss occurs at instruction (4), then instruction (5) cannot be executed until data is read into cache. Instruction (4) is a load instruction to add the contents of Register R3 and the value '0', and store the result in the register R1 as an access address.

Use of a non-blocking instruction is one of the methods to prevent performance degradation of computer systems caused by a cache miss penalty. By taking advantage of the non-blocking load instruction, the next instruction can be executed without waiting for completion of the data read into cache, even if a cache miss occurs. This method may lead to a reduction in the cache miss penalty.

However, if the instruction immediately after the non-blocking load instruction uses the data read by the preceding instruction, then it cannot be executed until completion of the data read. In this case, the cache miss penalty cannot be reduced. To effectively reduce the cache miss penalty, the non-blocking load instruction should be executed long before the instruction that uses the data brought by the non-blocking load instruction. In the example shown in FIG. 1, even if instruction (4) is a non-blocking load instruction, it is required to wait for completion of the data read into the cache, since instruction (5) is an add instruction to add the contents of register R1 and those of register R4, and store the result in register R3. Accordingly, the system efficiency is exactly the same regardless of whether the non-blocking load instruction is used or not.

To use the non-blocking instruction efficiently, instruction scheduler tries to schedule the load instructions as early as possible. By moving instruction (4) shown in FIG. 1 to an earlier part of the program as shown in FIG. 2, instructions (2) and (3) can be executed even if a cache miss occurs. Thus, system efficiency can be improved.

In FIG. 1, if the branch is satisfied, instruction (4) is not executed. While in FIG. 2, instruction (4) is always executed since load instruction (4) is moved before branch instruction (3).

The instruction (2) compares the contents of register R3 with the value '0'. If the result is '0', instructions (4) and (5) are not executed, and a branch to the area indicated by LABEL takes place in FIG. 1. If the value of register R3 is '0' at load instruction (4), an access address becomes '0'. An access to the address '0' is normally handled as an illegal access that causes an interrupt handling. Therefore, in FIG. 1 the branch to the area indicated by LABEL takes place at instruction (3) without causing the interrupt handling, while in FIG. 2 an interrupt always occurs since instruction (4) is moved before the branch instruction.

FIG. 3 shows an example program where instruction (4) in the area indicated by LABEL is moved before the branch instruction, as shown from the left-hand-side to the right-hand-side. In this case, if the branch takes place at instruction (3) and the original load instruction causes the interrupt handling, the handling itself is not considered to be illegal.

To prevent an illegal interrupt caused by moving a load instruction before a branch instruction as described above, a method to support two types of load instructions was contrived. The first type is a load instruction that does not cause an interrupt despite accessing an illegal address, and the second type is a load instruction that causes an interrupt. When moving a load instruction before than a branch instruction, a load instruction that does not cause an interrupt is used. Otherwise, a load instruction that causes an interrupt is used.

Further, a method to insert a sentinel instruction was contrived. The sentinel instruction determines if an interrupt handling should start at the location where a load instruction originally existed. FIG. 4 shows an example of such a program. In this program, when an interrupt factor occurs at load instruction (4), a specific value to report an occurrence of an interrupt factor and a required address, etc. are saved in register R1. Then, instruction (6) examines if register R1 stores the specific value, when informed of the occurrence of the interrupt factor. If stored, the interrupt handling procedure is executed. Otherwise, no processing is performed.

A method called boosting was also contrived. This method appends a new field to instruction fields, and the appended field can determine whether or not an instruction is moved before a branch instruction. A result executed by that instruction is saved to a dedicated register such as a shadow register, and whether or not an interrupt factor occurs is also saved in a shadow state. If the processing proceeds toward the original location of the moved instruction as a result of the branch instruction execution, the contents of the shadow register and shadow state are examined. If any saved interrupt factor is found, an interrupt handling is performed. When the processing after the branch instruction proceeds in a different direction, the contents of the shadow register and shadow state are cleared.

As described above, to move a load instruction before a branch instruction, it is required to properly perform the interruption caused by the instructions which are moved before the branch instruction, depending on whether or not processing proceeds toward the original location of the load instruction. Therefore, there is a problem in conventional techniques that require modifications to an instruction set, such as adding an instruction like a sentinel instruction, supporting two types of load instructions, and appending a new field to instruction fields.

SUMMARY OF THE INVENTION

An object of this invention is to properly perform an interrupt handling procedure when an interrupt factor occurs during execution of an instruction moved before a branch instruction, depending on whichever direction the processing after the branch instruction proceeds to, without modifying an instruction set such as by adding a new instruction.

With the feature of this invention implemented, the interrupt signal generation means, comprised of the interrupt signal generation means and the reset means for interrupt signal generation means, is set at the time an interrupt factor occurs during execution of the instruction moved before the branch instruction. If the processing after execution of the branch instruction proceeds toward the original location of the moved instruction, the interrupt signal generation means generates an interrupt signal in response to an interrupt factor.

Whereas if the processing proceeds in a different direction from the original location of the moved instruction, the reset means for the interrupt signal generation means resets the interrupt signal generation means.

That is, this invention enables the interrupt handling procedure to properly perform in response to the interrupt factor that occurred during execution of the instruction moved before the branch instruction, by properly controlling the execution of interrupt handling upon occurrence of the interrupt factor, without any modifications such as changing an instruction set, appending a new field to an instruction, etc. Since there is no need to perform extra processing when an interrupt factor does not occur, computer system speed will not be reduced during normal operation. Accordingly, this will greatly contribute to improving computer system efficiency.

BRIEF DESCRIPTION OF THE DRAWINGS

FIG. 1 shows an example program of a cache miss penalty;

FIG. 2 shows an example of a modified program using the non-blocking instruction;

FIG. 3 shows an example program including a moved load instruction to be executed after a branch instruction;

FIG. 4 shows an example program including an inserted sentinel instruction;

FIG. 5 illustrates the basic structure of the present invention;

FIG. 6 shows the block diagram for the whole structure of the interrupt processing unit presented in this invention;

FIGS. 11A and 11B shows an example program where a load instruction cannot be moved;

DETAILED DESCRIPTION OF THE PREFERRED EMBODIMENT

Figure 7:
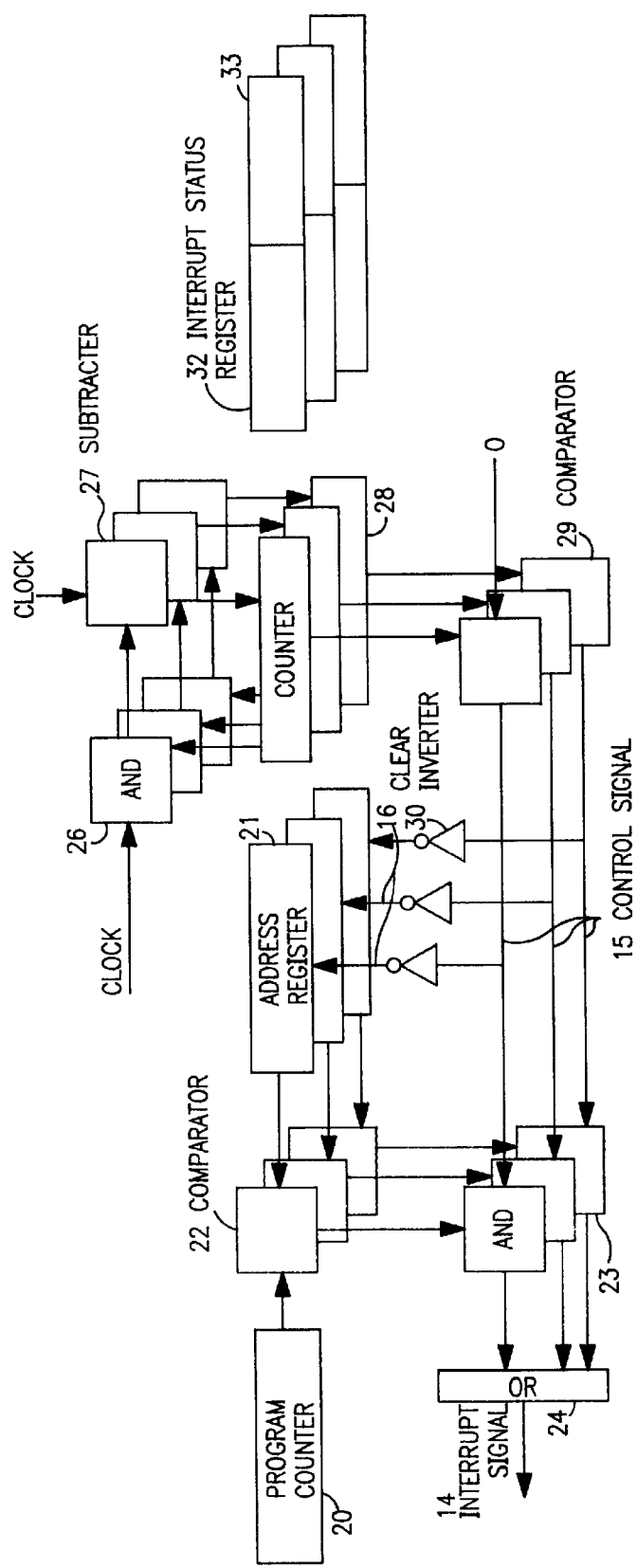
FIG. 7 illustrates in detail the circuitry of the interrupt signal generation unit.

FIG. 5 shows the block diagram for the basic structure of the present invention. This figure shows the basic structure of the Interrupt Processing Unit that can control execution or abortion of an interrupt in response to an interrupt factor occurring during execution of an instruction moved before a branch instruction, depending on a result executed by the branch instruction.

In FIG. 5, the interrupt signal generation means 1, which is set when an interrupt factor occurs during execution of the instruction moved before the branch instruction, generates an interrupt signal if the processing after execution of the branch instruction proceeds toward the original location of the moved instruction.

The reset means for interrupt signal generation means 2 resets the interrupt signal generation means 1 if the processing after execution of the branch instruction proceeds in a different direction from the original location of the moved instruction.

The interrupt signal generation means 1 comprises, for example, address registers, comparators, and logical gates. The address register holds an address of the above-mentioned branch instruction. The comparator compares an address contained in the address register with a current value of program counter, and checks to see if both values match the reset means for the interrupt signal generation means 2 does not output a reset signal at that time, the logical gate outputs an interrupt signal.

Meanwhile, the reset means for the interrupt signal generation means 2, for example, comprises counters and comparators. This means sets a maximum pass length L, which is the number of instructions corresponding to the longest of all the instruction sequences from the load instruction to the branch instruction which is first skipped. Each time an instruction is executed, the counter value is decremented by 1. When the counter value reaches '0', the comparator outputs a reset signal to reset the interrupt signal generation means 1.

Next, an explanation of the behavior of the interrupt processing unit is given below:

With this invention implemented, a cause of an interrupt factor is examined at the time the interrupt factor occurs. If the interrupt factor is one that occurs during execution of an instruction moved before a branch instruction, normally the interrupt signal generation device is set. That is, the address of the branch instruction is assigned to the above-mentioned address register, and the maximum path length L, which is the number of instructions corresponding to the longest instruction sequence from the instruction that causes the interrupt to the above-mentioned branch instruction, is assigned to the above-mentioned counter. Then finally the interrupt signal generation device is set.

After that, instructions are executed in sequence. At the time when the program counter value and the address of the branch instruction stored in the address register match, the interrupt signal generation means 1 outputs an interrupt signal. When the interrupt signal generation means is set as described above, the address of the instruction that causes the interrupt factor and the cause of interrupt factor, are saved to a register, such as the interrupt status register depending on which direction the processing after execution of the branch instruction proceeds to. Whether to execute or abort the interrupt handling is determined by, for example, software, depending on the direction of the processing after the branch instruction.

Meanwhile, the value of the above-mentioned counter is decremented by 1 each time an instruction is executed. When the counter reaches the value '0', the reset means for the interrupt signal generation means 2 outputs a reset signal. That is, this means resets the interrupt signal generation means 1 if the processing after execution of the branch instruction proceeds in a different direction from the original location of the moved instruction.

FIG. 6 shows the block diagram for the complete structure of the interrupt processing unit. This unit comprises the central processing unit (CPU) 10, the memory 11, and the interrupt signal generation device 12.

Details of the interrupt signal generation device structure are shown in FIG. 7. Clock signals are supplied to this device 12 as well as to the CPU 10, and the interrupt signal generation device 12 outputs an interrupt signal 14 to the CPU 10. Regarding the contents of the load module 13 contained in the memory 11, an explanation will be provided later.

FIG. 7 shows the block diagram of the details of the interrupt signal generation device 12, whose simplified block diagram is shown in FIG. 6. In this figure, the interrupt signal generation device 12 shown in FIG. 6 comprises comparators 22 that compare a value of the program counter 20 with the contents of the address register 21 that stores an address of branch instruction to be described later, the AND gate 23 to which is supplied a control signal and an output from the comparator 22, the OR gate 24 to which is supplied multiple outputs from the AND gate 23, the AND gate 26 to which is supplied a clock signal and an output from the counter 28 to be described later, the subtracter 27 that subtracts 1 from an output generated from the AND gate 26 each clock signal input and outputs a result to the counter 28, the counter 28 whose value is set to a pass length to be described later, the comparator 29 that compares an output from the counter 28 with '0', and the inverter 30 that outputs the clear signal 16 to the address register 21 after inverting the control signal 15 output from the comparator 29. The program counter 20, the address register 21, the comparator 22, the AND gate 23, and the OR gate 24, are contained in the interrupt signal generation means 1 shown in FIG. 5. The AND gate 26, the subtracter 27, the counter 28, the comparator 29, and the inverter 30 are contained in the reset means for the interrupt signal generation means 2 shown in FIG. 5.

The interrupt signal generation device 12 further comprises the interrupt status register 32 & 33 that holds an address of the load instruction and a cause of an interrupt factor, depending on whether the load instruction moved before the branch instruction originally located in a taken branch path. The left field of the register 32 holds an address and a cause of interrupt factor when the load instruction originally located in the taken branch path, while the right field of the register 33 holds an address and a cause of an interrupt factor when the load instruction originally located in the not-taken branch path.

Figures 8A, 8B, 9:
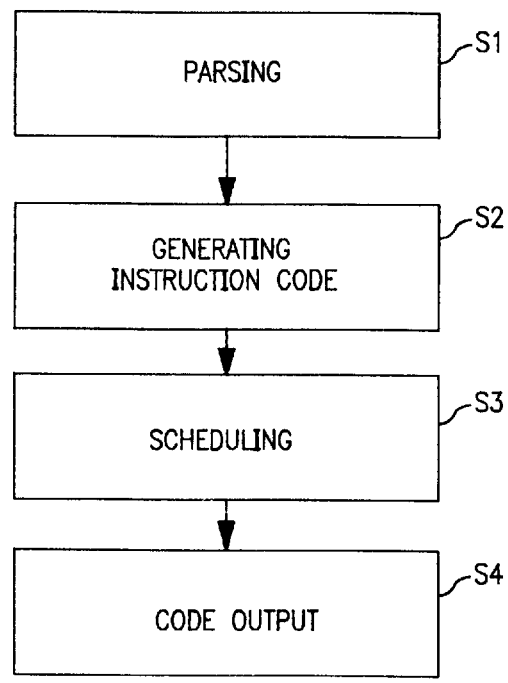
FIGS. 8A and 8B shows an example of an interrupt control table generated in the load module.
FIG. 9 is the operational flowchart for the processing of load module output by a compiler.

FIG. 8 shows an example of the contents of the load module 13 contained in the memory 11 shown in FIG. 6. FIG. 8A shows the program stored in the load module 13, which is exactly the same as the program shown in FIG. 2, but an address is added to each instruction.

FIG. 8B shows an example of the interrupt control table which is, for example, stored after the program in the load module 13. In an embodiment of this invention, a compiler is intended to output the following data in a control table format: a destination address of the instruction moved before the branch instruction, an address of the first branch instruction that is skipped by the instruction while moving from the source to the destination, a branch direction that indicates where the load instruction originally located, and a pass length from the source to the above-mentioned branch instruction, which is the maximum length among all the instruction sequences in between. The value '0' of the branch direction indicates that the load instruction moved from the direction where a branch does not take place as the program shown in FIG. 2, and the value '1' of the branch direction indicates that the load instruction moved from the direction where a branch does take place, which means the load instruction moved before the branch instruction as shown in FIG. 3. The pass length indicates the number of instructions, 3 in this case, which is the distance from (4) and (3) when moving the load instruction in FIG. 8(a).

FIG. 9 shows the flowchart for the whole processing of the load module output. In this figure, the program is first parsed in Step S1. After each instruction code is generated in Step S2, scheduling is performed in Step S3. And finally both program code and an interrupt control table are output in Step S4.

Figure 10:
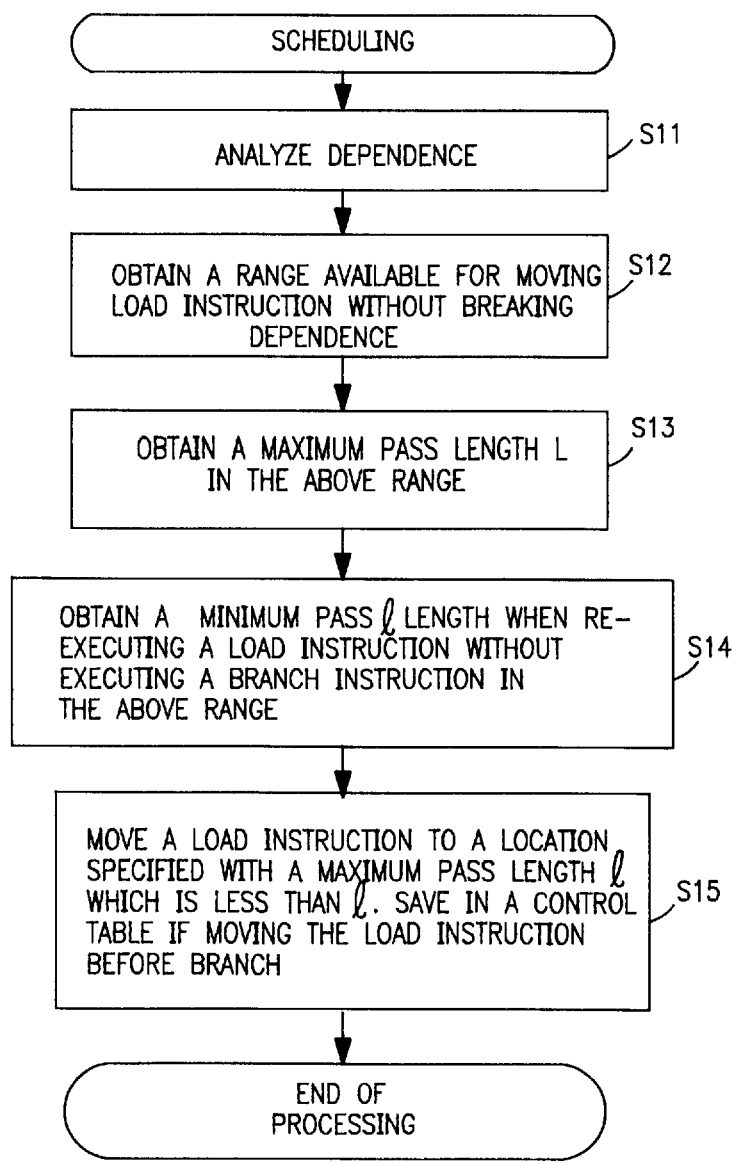
FIG. 10 is the operational flowchart detailing the process of scheduling.

FIG. 10 shows the flowchart for detailing the process of scheduling shown in FIG. 9, Step S3. A dependence between variables is first analyzed in Step S11. In Step S12, a range available for moving the load instruction is obtained on condition that the dependence between variables is maintained. To maintain a dependence means values of variables should be decided before they are used in a program.

After the range available for moving the load instruction is obtained, a maximum pass length L is obtained in that range in Step S13. The maximum pass length L is equivalent to the number of instructions which is the longest of all the instruction sequences between the load instruction and the first skipped branch instruction.

Then, a minimum pass length l, which is the shortest of all the instruction from the load instruction to the branch instruction that is first skipped by the load instruction sequences when re-executing the load instruction without executing the branch instruction that is first skipped by the load instruction during moving in the range available for moving the load instruction, is obtained in Step S14.

As explained in FIG. 7, the counter 28 is set to the value of the maximum pass length L, which is decremented each execution of an instruction. When the value of the counter 28 reaches '0', the contents of the address register 21 are cleared. To ensure the control not to cause an interrupt signal incorrectly, it is provided that the load instruction should not be moved when the maximum pass length L is greater than the minimum pass length l. Besides, the load instruction is moved to the location specified with the maximum pass length L, on condition that the maximum pass length L is less than the minimum pass length l, as described in Step S15 in FIG. 10. If the load instruction is moved before the branch instruction, registration is made in the interrupt control table shown in FIG. 8B.

FIG. 11 shows an example of moving the load instruction when the maximum pass length L is greater than the minimum pass length l.

Assume that the load instruction located at the end of the program shown in FIG. 11A is moved to the fourth line shown in FIG. 11B.

At that time, the maximum pass length L is equivalent to the number of instructions that are sequentially executed from the load instruction in the fourth line. The maximum pass length L in this case is 12, which is the pass length from the load instruction to the branch instruction (*). Since the LABEL instruction is not a machine instruction, it is counted as '0'.

Meanwhile, the minimum pass length l is the pass to reach the branch instruction by branching to LABEL1 at branch instruction (1) after the first execution of the load instruction, and branching not to LABEL1 at the branch instruction (1), but LABEL2 at branch instruction (2), after the second execution of the load instruction. After all, the minimum pass length l is calculated to be '11', which is less than the maximum pass length L.

As described above, a value of the maximum pass length is assigned to the counter 28 shown in FIG. 7. Accordingly, if moving an instruction whose maximum pass length is greater than the minimum pass length l is allowed, an interrupt signal can occur during the processing for the minimum pass length l. When the counter 28 is set to the value of the maximum pass length L, '12' in this case, by an interrupt factor occurring at the first load instruction during the processing for the minimum pass length l, the interrupt handling procedure is performed even if an interrupt factor does not occur during the second execution of the load instruction after branch instruction (1).

The interrupt factor during the first execution of the load instruction is enabled only when the instructions are sequentially executed until reaching the original location of the load instruction. If the processing proceeds in a different direction due to branch instruction (1), the interrupt factor should be disabled. Therefore, performing the interrupt handling for this interrupt factor is considered to be unnecessary. Thus, in this invention, it is provided that the load instruction should not be moved when the maximum pass length L is greater than the minimum pass length l.

Figure 12:
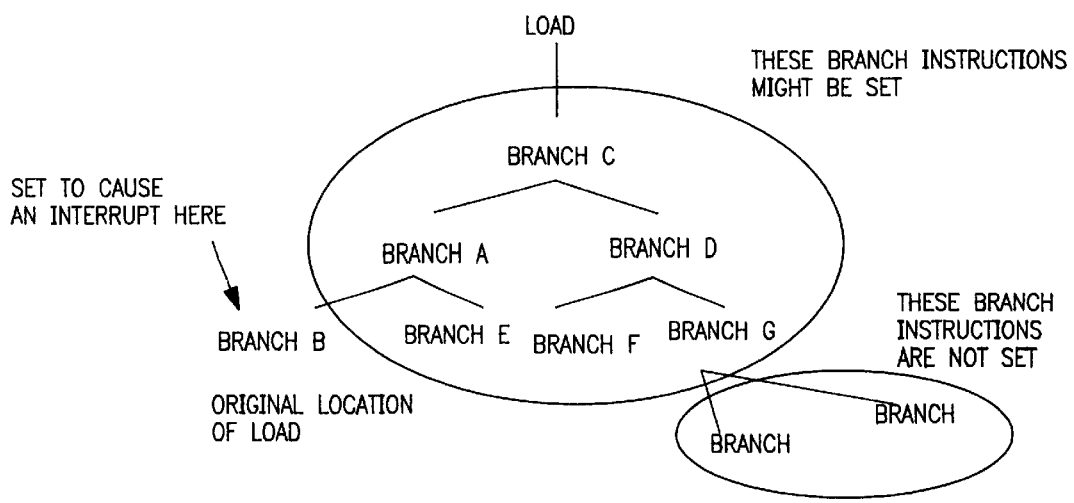
FIG. 12 shows the number of the address register.

Going back to the block diagram of the interrupt signal generation device 12 shown in FIG. 7, further details on the interrupt handling procedure of this invention are given below. As described above, when the load instruction is moved before the branch instruction, an address of the branch instruction first skipped by the load instruction is stored in the address register 21 according to the interrupt control table shown in FIG. 8B. FIG. 12 illustrates the number of branch instruction addresses contained in the address register 21. Assume that the load instruction is moved to a location via a total of three branches: branch B first, then branches A and C. In the interrupt signal generation device 12, the number of branch instruction addresses that might be saved in the address register 21 totals 7 from branch A through branch G, on the assumption that each instruction branches to two directions. If an instruction is moved to a location via 'L' branch instructions, the number of addresses required for the address register 21 shown in FIG. 7 is calculated by the following formula:

$$n = 2^L - 1$$

If the value of the program counter 20 matches the address of the branch instruction contained in the address register 21 in FIG. 7, the comparator 22 outputs the value '1'. If the comparator 29 outputs the value '1' as a control signal, the AND gate 23 outputs '1', and an interrupt signal is output via the OR gate 24.

When an interrupt factor occurs, an address of the branch instruction is saved to the address register 21 and a value is assigned to the counter 28 at the same time. The counter value set at that time is the maximum pass length L described above, and the value is decremented each time a clock signal is input.

Figure 13:
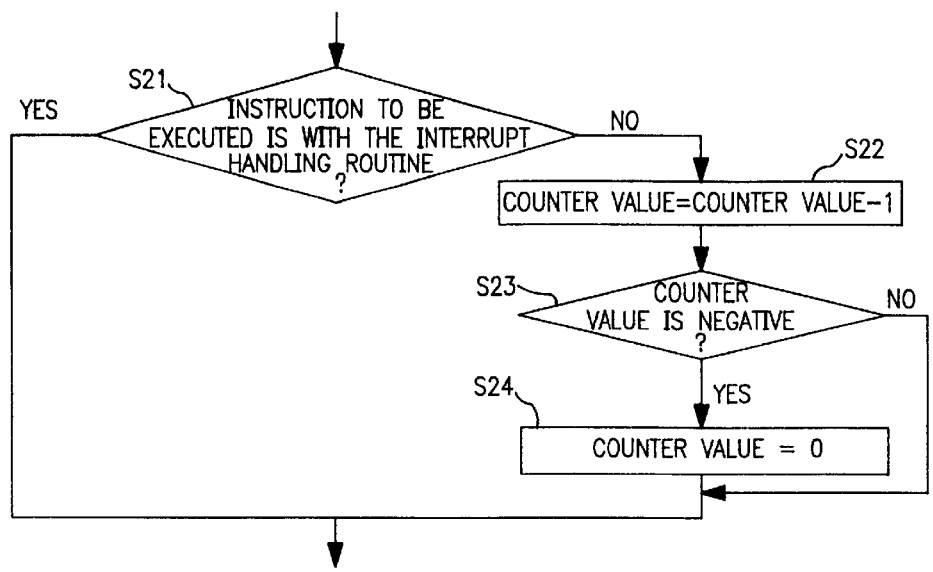
FIG. 13 is the operational flowchart for counter operation.
Figure 14:
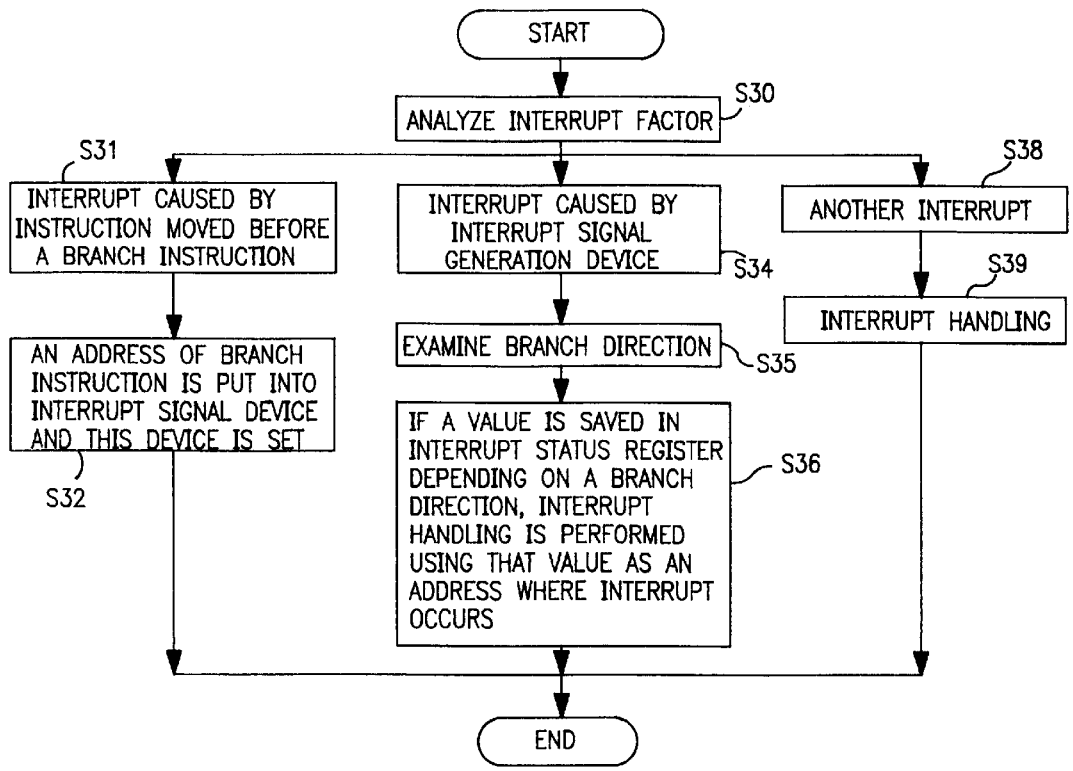
FIG. 14 is the operational flowchart for the entire interrupt handling routine.

FIG. 13 shows the flowchart of the above-mentioned counter operation. In Step S21, whether or not an instruction to be executed is the one included in the interrupt handling routine is determined in Step S21. If the instruction is determined as the one included in the interrupt routine, no processing is performed. This means the counter value is not decremented. On the contrary, if the instruction is not included in the interrupt handling routine, the counter value is decremented in Step S22. Then, whether or not the value is negative is determined in Step S23. If negative, the counter is set to the value '0' in Step S24. Otherwise, no processing is performed. FIG. 14 shows the flowchart for the entire interrupt handling routine of this invention. In FIG. 14, the routine first analyzes an interrupt factor in Step S30. If the interrupt is determined to be the one caused by the load instruction moved before the branch instruction in Step S31, values such as an address of the branch instruction, etc. are saved to the interrupt signal generation device 12 shown in FIG. 7, and finally this interrupt signal generation device 12 is set in Step S32.

Meanwhile, if the interrupt is determined to be the one caused by the interrupt signal generation device 12 in Step S34, the routine determines which direction the processing proceeds in after execution of the branch instruction first passed by the moved instruction, that is, the branch direction in step S35. If there is a value saved in the interrupt status register, the interrupt handling routine is performed using that value as an address where an interrupt occurs in Step S36, and the processing is terminated.

Figure 15:
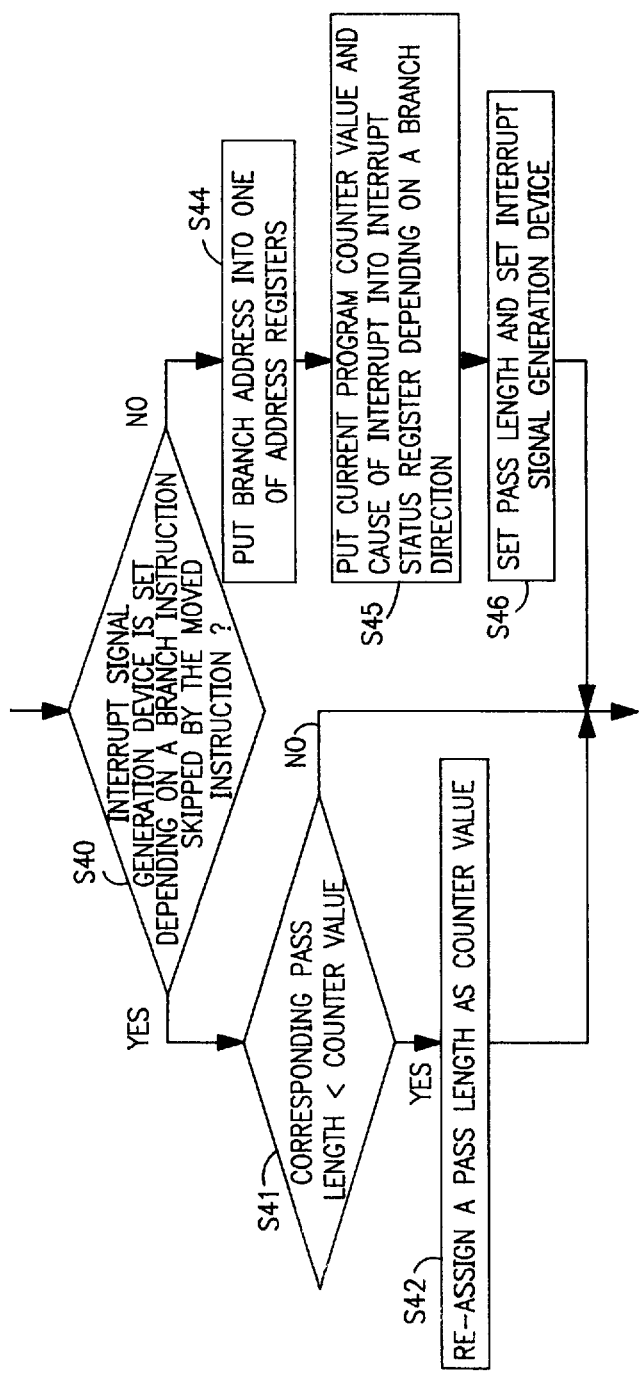
FIG. 15 is the operational flowchart detailing the setting procedure for the interrupt signal generation device.

If the interrupt factor is determined to be another interrupt in Step S38, the interrupt handling procedure is performed and terminated in Step S39. FIG. 15 shows the flowchart of the detailed setup procedure for the interrupt signal generation device 12. First of all, the set up procedure determines if the interrupt signal generation device 12 is already set by the moved instruction depending on a branch direction in Step S40. If it is set, the set up procedure determines if the pass length corresponding to the current interrupt factor is less than the counter value in Step S41. If the pass length is greater than the counter value, the pass length is left unchanged. Otherwise, the pass length is re-assigned as a counter value, and the procedure is complete.

Figure 16:
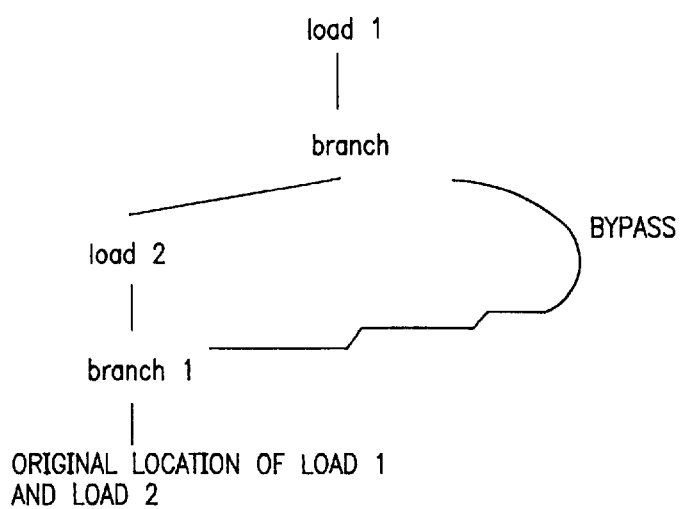
FIG. 16 shows the re-assignment of the counter value.

FIG. 16 illustrates how a pass length shown in Steps 41 and 42 in FIG. 15 is re-assigned. In FIG. 16, assume that an interrupt factor occurs during execution of the load 1 instruction and the interrupt signal generation device 12 shown in FIG. 7 is set. Since the pass used at that time is the one that bypasses and reaches branch 1, the counter is set to the value of the pass length via bypass. Later, at the time the load 2 instruction is executed, the processing proves not to be performed via the bypass. Therefore, the value of the pass length from the load 2 instruction, which is less than the current value, is re-assigned to the counter.

Even if an interrupt factor occurs during execution of the load 2 instruction, the address of that instruction and the cause of the interrupt factor are not saved to the interrupt status register. This is because when execution control is transferred to the branch instruction, processing control is transferred to the instruction where the interrupt factor first occurs, the interrupt handling routine that performs the processing such as re-execution of the load 1 instruction, etc. in this example, and the routine checks to see whether there is any other instruction where an interrupt factor occurs, if needed.

If the interrupt signal generation device 12 shown in FIG. 7 is not determined to be set in Step S40 in FIG. 15, an address of the branch instruction is saved to one of the address registers 21 in Step S44. Then, in Step S45, the current program counter value and the cause of the interrupt factor are saved to the interrupt status register 32 & 33, whose contents depend on the direction from which the load instruction moved. In Step S46, the counter 28 is set to a pass length, and finally the interrupt signal generation device 12 is set.

The detailed explanation of the above embodiment is provided on the assumption that an address of the branch instruction first skipped by a moved instruction is saved to the address register 21 shown in FIG. 7, and a destination address of the moved instruction and a cause of an interrupt factor are saved to the interrupt status register 32 & 33, depending on the direction from which the load instruction moved, indicated by the value '0' or '1'. This invention, however, is not limited to this embodiment. This invention is also applicable to an embodiment where a source address of the moved instruction can be assigned to the address register.

In this case, an interrupt signal can occur only when the processing after execution of the branch instruction proceeds to the above source address. Therefore, it would be possible to properly perform interrupt handling by simply storing a destination address of the load instruction and a cause of interrupt factor into the interrupt status register 32, without using interrupt status register 33. In this embodiment, the restriction to 'correspond to branch directions' imposed in FIG. 15 Step 45 and FIG. 14 Step S36 is no longer required. Also, the restriction to 'examine a branch direction' is not required. An address that is put into the address register 21 in FIG. 15 Step S44 is the source address of the load instruction moved.

The above embodiments disclose a trap caused by an interval interrupt factor, for example, by a program interruption as well as an interruption caused by an interval interrupt factor.

What is claimed is:

1. An interrupt Processing Apparatus comprising:
   interrupt signal generation means, set when an interrupt factor occurs during execution of a moved instruction, which has been moved prior to a branch instruction, for generating an interrupt signal in response to the interrupt factor when processing after execution of the branch instruction proceeds towards the original location of the moved instruction, said interrupt signal generation means comprising:
      address register means for storing an address of the branch instruction;
      comparison means for comparing an address stored in said address register means with a current program counter value; and
      logic gate means for outputting an interrupt signal when said comparison means finds a match between the address and the current program counter value, and when a reset signal has not been output;
   reset means for resetting said interrupt signal generation means when processing after execution of the branch instruction proceeds in a direction different from the original location of the moved instruction; and
   control means for controlling an interrupt execution based on an interrupt factor which occurs during execution of the moved instruction in response to the interrupt signal.

2. An interrupt Processing Apparatus comprising:
   interrupt signal generation means, set when an interrupt factor occurs during execution of a moved instruction, which has been moved prior to a branch instruction, for generating an interrupt signal in response to the interrupt factor when processing after execution of the branch instruction proceeds towards the original location of the moved instruction;
   reset means for resetting said interrupt signal generation means when processing after execution of the branch instruction proceeds in a direction different from the original location of the moved instruction, said reset means comprising:
      a counter for decrementing a maximum pass length L assigned as a counter value, L being the number of instructions corresponding to the longest instruction sequence from the source location to the branch instruction is first skipped by the moved instruction; and
      a comparator for outputting a reset signal to reset said interrupt signal generation means when a value of said counter reaches '0'; and
   control means for controlling an interrupt execution based on an interrupt factor which occurs during execution of the moved instruction in response to the interrupt signal.

3. An interrupt Processing Apparatus comprising:
   interrupt signal generation means, set when an interrupt factor occurs during execution of a moved instruction, which has been moved prior to a branch instruction, for generating an interrupt signal in response to the interrupt factor when processing after execution of the branch instruction proceeds towards the original location of the moved instruction;
   reset means for resetting said interrupt signal generation means when processing after execution of the branch instruction proceeds in a direction different from the original location of the moved instruction;
   control means for controlling an interrupt execution based on an interrupt factor which occurs during execution of the moved instruction in response to the interrupt signal; and
   means for moving the instruction before the branch instruction so that a maximum pass length L, equal to the number of instructions corresponding to the longest instruction sequence from the source location to the branch instruction first skipped by the moved load instruction, can be less than the minimum pass length l, which is the number of instructions corresponding to the shortest instruction sequence from the source location to the branch instruction first skipped by the moved instructions, when executing the branch instruction first skipped by the instruction during moving after the second execution of the moved instruction without executing the branch instruction between the first and the second execution of the moved load instruction.

4. An interrupt Processing Apparatus:
   interrupt signal generation means, set when an interrupt factor occurs during execution of a moved instruction, which has been moved prior to a branch instruction, for generating an interrupt signal in response to the interrupt factor when processing after execution of the branch instruction proceeds towards the original location of the moved instruction;
   reset means for resetting said interrupt signal generation means when processing after execution of the branch instruction proceeds in a direction different from the original location of the moved instruction;
   control means for controlling an interrupt execution based on an interrupt factor which occurs during execution of the moved instruction in response to the interrupt signal;
   address register means for storing the branch instruction address first skipped by the moved instruction;

comparison means for comparing an address stored in said address register means with a current value of said program counter; and logic gate means for outputting an interrupt signal when said comparison means finds a match between the address and the value of said program counter, and said reset means for interrupt signal generation means does not simultaneously output a reset signal.

5. An interrupt Processing Apparatus comprising:

interrupt signal generation means, set when an interrupt factor occurs during execution of a moved instruction, which has been moved prior to a branch instruction, for generating an interrupt signal in response to the interrupt factor when processing after execution of the branch instruction proceeds towards the original location of the moved instruction;

reset means for resetting said interrupt signal generation means when processing after execution of the branch instruction proceeds in a direction different from the original location of the moved instruction:

control means for controlling an interrupt execution based on an interrupt factor which occurs during execution of the moved instruction in response to the interrupt signal; and a load module for storing a destination address of the moved instruction, a branch direction from which the moved instruction moved, and the maximum pass length which is the number of instructions corresponding to the longest instruction sequence from the moved load instruction to the branch instruction that is first skipped by the moved instruction.

6. An interrupt Processing Apparatus according to claim 5, wherein said interrupt signal generation means comprises:

first storage means for reading an address of the branch instruction from said load module and storing the address when an interrupt factor occurs during execution of the moved instruction; and first determining means for determining that the processing after execution of the branch instruction proceeds toward the original location of the moved instruction, when the address and the current value of said program counter matches.

7. An interrupt Processing Apparatus according to claim 5, wherein said reset means for interrupt signal generation means comprises:

second storage means for reading the maximum pass length from said load module and storing the maximum pass length when an interrupt factor occurs during execution of the moved instruction; and second determining means for determining that the processing after execution of the branch instruction proceeds in a different direction from the original location of the moved instruction, when the instructions whose number corresponds to the maximum pass length are executed.

8. A method for handling an interrupt in a data processing apparatus, the method comprising the steps of:

determining a cause of an interrupt factor, such as being caused by moving an instruction prior to a branch instruction or being generated by an interrupt signal generation device:

performing corresponding procedures depending on the cause of the interrupt;

setting an interrupt signal generation device if the interrupt factor is caused by moving an instruction before a branch instruction, and when the interrupt signal generation device is set, performing the steps of determining of:

determine if the interrupt signal generation device is already set for the branch instruction that is first skipped by the moved instruction;

determining if the pass length corresponding to the instruction that causes the interrupt factor is less than a counter value; and re-assigning the pass length as a value of said counter if the pass length is less than the counter value.

9. A method for handling an interrupt in a data processing apparatus, the method comprising the steps of:

determining a cause of an interrupt factor, such as being caused by moving an instruction prior to a branch instruction or being generated by an interrupt signal generation device;

performing corresponding procedures depending on the cause of the interrupt:

setting an interrupt signal generation device if the interrupt factor is caused by moving an instruction before a branch instruction; and if the interrupt signal generation device is set performing the steps of;

determining if said interrupt signal generation device is already set for the branch instruction that is first skipped by the moved instruction;

if said interrupt signal generation device is not set, assigning an address of the branch instruction first skipped by the moved instruction to an address register;

storing a current value of said program counter and a cause of an interrupt factor in an interrupt status register; and setting said interrupt signal generation device by setting a counter to the maximum pass length L, which is the number of instructions corresponding to the longest instruction sequence from the moved load instruction to the branch instruction that is first skipped the moved load instruction.

10. A method for handling an interrupt in a data processing apparatus, the method comprising the steps of:

determining a cause of an interrupt factor, such as being caused by moving an instruction prior to a branch instruction or being generated by an interrupt signal generation device;

performing corresponding procedures depending on the cause of the interrupt;

setting an interrupt signal generation device if the interrupt factor is caused by moving an instruction before a branch instruction; and if the interrupt signal generation device is set, the interrupt signal generation device performs performing the steps of:

determining if said interrupt signal generation device is already set for a source address of the moved instruction;

if said interrupt signal generation device is not set, assigning the source address of the moved instruction to an address register;

storing a current value of said program counter and a cause of an interrupt factor in an interrupt status register; and setting said interrupt signal generation device by setting a counter to the maximum pass length L, which is the number of instructions corresponding to the longest instruction sequence from the source location to the destination location of the moved instruction.

* * * * *

UNITED STATES PATENT AND TRADEMARK OFFICE
CERTIFICATE OF CORRECTION

PATENT NO. : 5,812,837

DATED : September 22, 1998

INVENTOR(S) : Ozawa

It is certified that error appears in the above-identified patent and that said Letters Patent is hereby corrected as shown below:

Title Page, Col. 2, "OTHER PUBLICATIONS":

line 2, change "Vassiliades" to --Vassiliadis--;
    line 4, after "penalty" insert --in a parallel--;
    lines 7 and 8, change "speculation" to
        --speculative execution--.
    line 11, change "IBM," to --IBM--.

Col. 1, line 48, START A NEW PARAGRAPH with "In the.."

Col. 10, line 50, after "Apparatus" insert --comprising--.

Col. 11, line 67, delete "determining of".

Signed and Sealed this

Twentieth Day of April, 1999

Attest:

Q. TODD DICKINSON

*Attesting Officer*     *Acting Commissioner of Patents and Trademarks*